United States Patent [19]

Pöllinger

[11] 4,042,071
[45] Aug. 16, 1977

[54] WHEEL AND AXLE ASSEMBLY FOR RAILWAY VEHICLES HAVING DISC BRAKES

[75] Inventor: Hans Pöllinger, Munich, Germany

[73] Assignee: Knorr-Bremse GmbH, Munich, Germany

[21] Appl. No.: 758,762

[22] Filed: Jan. 12, 1977

Related U.S. Application Data

[63] Continuation of Ser. No. 606,599, Aug. 21, 1975, abandoned.

[30] Foreign Application Priority Data

Apr. 3, 1975 Germany .............................. 2514597

[51] Int. Cl.² .............................................. B60T 1/06
[52] U.S. Cl. .................................... 188/18 A; 188/59; 188/71.4
[58] Field of Search ............. 188/18 A, 218 XL, 71.4, 188/58, 59, 71.5; 192/70, 107 R

[56] References Cited

U.S. PATENT DOCUMENTS

| 2,174,400 | 9/1939 | McCune | 188/59 X |
| 2,286,517 | 6/1942 | Tack | 188/59 |

FOREIGN PATENT DOCUMENTS

| 669,762 | 8/1929 | France | 188/59 |
| 1,151,276 | 7/1963 | Germany | 188/218 XL |

*Primary Examiner*—George E. A. Halvosa
*Attorney, Agent, or Firm*—Edmund M. Jaskiewicz

[57] ABSTRACT

A wheel and axle assembly for railway vehicles has a pair of brake discs mounted on the axle and each brake disc comprises a hub which is force-fitted on a portion of the axle and a friction disc member mounted on the hub. Each of the hubs is axially offset with respect to the central radial plane of its respective friction disc member. The brake discs are juxtaposed in mirror-image relationship to each other with the end faces of the hubs axially remote from the respective friction disc members being substantially in contact with each other.

5 Claims, 1 Drawing Figure

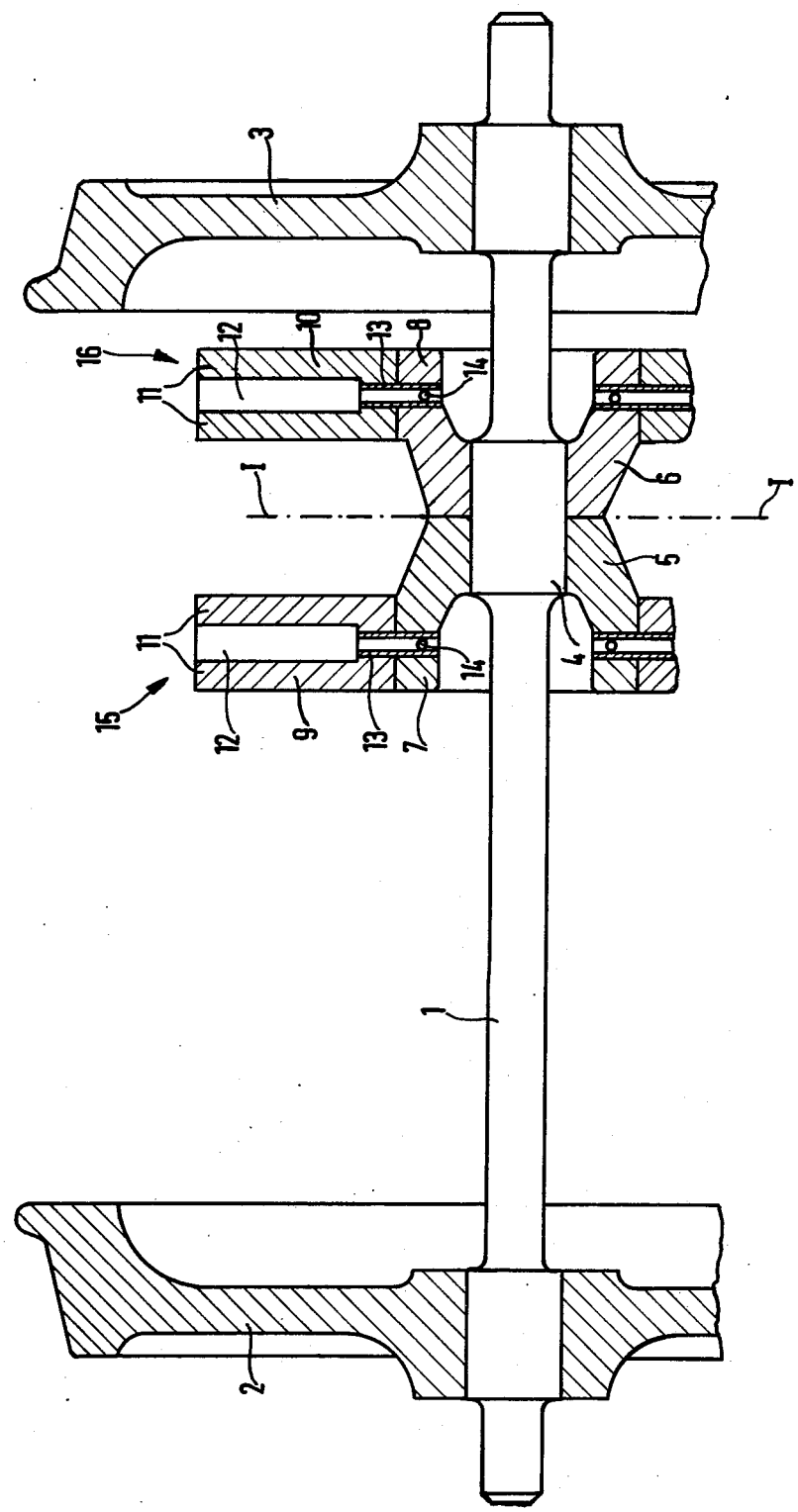

WHEEL AND AXLE ASSEMBLY FOR RAILWAY VEHICLES HAVING DISC BRAKES

This is a continuation of application Ser. No. 606,599 filed Aug. 21, 1975, now abandoned.

The present invention relates to a wheel and axle assembly for railway vehicles with at least two brake discs mounted on the axle, more particularly, to the structure of the brake discs.

In railway vehicles provided with disc brakes, a brake disc is generally mounted on an axle of an axle and wheel assembly on the railway vehicle. If it was desired to increase the braking power of the vehicle two brake discs have been mounted on the axle. These brake discs have been generally mounted on the axle spaced from each other and in such a manner that a brake disc is located in the vicinity of each of the wheels mounted on the axle. The brake discs are generally mounted on the axle by means of a shrink-fit and it was thereby necessary to provide two separate interference fit sections on each axle. This resulted in considerably increasing machine costs incurred in shaping the axle.

It was proposed in German utility model Pat. No. 7,427,100 to simplify the above mentioned wheel assembly by providing two brake discs on an axle with the brake discs being force fitted on a single hub element which in turn was mounted on the axle. While this single hub carrying two friction disc elements was shorter in axial length than two individual hubs as previously employed, the single hub element was still longer in axial length than a single hub element upon which only one friction disc element was mounted. It was therefore readily apparent that the fabrication of a longer hub for mounting two brake discs involved considerable expense since the hub was manufactured generally from cast steel.

It is therefore the principal object of the present invention to provide a novel and improved wheel assembly for railway vehicles having disc brakes.

It is another object of the present invention to provide a wheel assembly wherein two brake discs are mounted on an axle in such a manner so as to overcome the disadvantages of mounting two brake discs upon a single elongated hub.

According to one aspect of the present invention a wheel and axle assembly for railway vehicles may comprise a pair of brake discs on an axle. Each brake disc comprises a hub force-fitted on a portion of the axle and a friction disc member mounted on the hub. Each of the hubs is axially offset with respect to the central radial plane of its respective friction disc member. The brake discs are juxtaposed in mirror-image relationship to each other with the end faces of the hubs axially remote from the respective friction disc members being substantially in contact with each other.

As a result of this novel and improved construction, each axle of an axle and wheel assembly need have only one force-fit section upon which both brake discs are to be mounted. Further, this fit section may be of substantially the same axial length as the fit section on an axle upon which is mounted a single elongated hub to which are secured two friction disc members. The costs of fabrication of such a wheel and axle assembly are significantly decreased since only two relatively short and inexpensive hubs are required.

Other objects and advantages of the present invention will be apparent upon reference to the accompanying description when taken in conjunction with the following drawing, which is exemplary, wherein there is shown an axial sectional view of a wheel and axle assembly upon which are mounted brake discs according to the present invention.

The wheel and axle assembly for railway vehicles provided with brake discs is shown in the drawing and comprises an axle 1 having flanged wheels 2 and 3 shrink-fitted adjacent to the ends of the axle. Between the wheels 2 and 3 and in the vicinity of the wheel 3 the axle 1 is provided with a machined force-fit section 4 of a relatively short length.

Mounted on the axle section 4 are two brake discs indicated generally as 15 and 16. The brake discs comprise hubs 5 and 6 which are pressed or shrunk-fit onto the axle section 4 such that the end faces of the hubs facing each other contact each other or at least are substantially in contact with each other. These end faces lie in a plane I—I extending radially through the axle 1 and through the center of the axle force-fit section 4. The ends of the hubs 5 and 6 remote from the plane I—I are provided with annular or ring sections 7 and 8 which surround the axle 1 and are radially spaced therefrom. On the outer periphery of each of the annular sections 7 and 8 there is mounted an annular friction disc member 9 and 10 respectively. Each friction disc member comprises two friction discs 11 axially spaced with respect to each other and a plurality of ventilation ribs 12 interconnect both of the friction ribs 11 of a brake disc. The annular sections of 7 and 8 are formed with a plurality of radial bores which are uniformly spaced over their peripheries and have pressed into them clamping sleeves 13 which project radially outwardly into corresponding bores formed in the friction disc elements 9 and 10.

Pins 14 extend transversely through the clamping sleeves 13 and are received into appropriate bores formed in the annular sections 7 and 8 so as to secure the clamping sleeve 13 against radial movement. The elements 5, 7, 9, 13 and 14 as described above thus constitute the brake disc 15; and the elements 6, 8, 10, 13 and 14 as described above constitute the brake disc 16.

The two brake discs 15 and 16 are mounted upon the axle section 4 in mirror image relationship to each other and with respect to the plane I—I. Thus, the brake discs 15 and 16 are formed from identical elements. The abutment of the two hubs 5 and 6 sets up in the plane I—I in the axle section 4 an advantageous notched stressing profile. As a result, the force-fit section 4 can be made as short as a single one-piece hub upon which two friction disc members are to be mounted as disclosed in the prior art. The axial length of the axle section 4 is thus substantially shorter than twice the length of an axle force-fit section upon which is to be mounted a single brake disc.

The axial off-set construction of the hubs 7 and 8 permits a significant axial spacing of the friction disc members 9 and 10. This axial spacing is adequate for accommodating brake shoes and supporting rigging to enable the brake shoes to act on both sides of each of the friction disc members. In addition, a cooling stream of air is able to pass in a radial direction through the sleeves 13 to achieve a cooling effect on the hubs 5 and 6. Also, the projecting construction of the annular sections 7 and 8 achieves a certain resiliency or suspension effect which transmits excessive impact stresses from the axle 1 to the friction disc members 9 and 10.

The mounting of the friction disc members upon the hubs by means of the radially extending sleeves enables obtaining an adequate axial space between the disc members while employing an axle force fit section which is relatively short. In addition, the seating of the clamping sleeves as disclosed herein avoids blind bores for receiving the clamping sleeves which type of bores require expensive manufacturing operations.

Thus it is apparent that the offset structure of the hubs enables a pair of brake discs to be mounted on a relatively short portion of the axle while at the same time adequate axial space is provided between the brake discs to accommodate brake shoes and supporting structure. The structure for mounting a brake disc is thus simple and is less expensive to manufacture both because of the simplicity of the components and because only a single section of the axle of a relatively short length need be machined for force-fitting the brake discs thereon.

It will be understood that this invention is susceptible to modification in order to adapt it to different usages and conditions, and accordingly, it is desired to comprehend such modifications within this invention as may fall within the scope of appended claims.

What is claimed is:

1. In a wheel and axle assembly for railway vehicles, a pair of brake discs on an axle, each brake disc comprising a separate hub having end faces and a force-fitted portion on the axle, each said hub having an axially offset annular portion radially spaced from and surrounding the axle and a friction disc member mounted on said spaced annular portion so that each of said force-fitted portions of said hubs is axially offset from the central radial plane of its respective friction disc member such that any radial expansion of said fricton discs will not be transmitted directly, radially to the force-fitted portions of said hubs, said brake discs being juxtaposed in a mirror-image relationship to each other with the end faces of the separate hubs axially remote from the respective friction disc members being substantially in contact with each other.

2. In a wheel and axle assembly as claimed in claim 1 and a plurality of clamping sleeves seated in radial bores spaced about the periphery of said hub annular portion and in bores in said friction disc member aligned therewith to secure said disc member to said hub.

3. In a wheel and axle assembly as claimed in claim 2 and transverse pins passing through said sleeves in said hub annular portions to secure said sleeves therein against radial displacement.

4. In a wheel and axle assembly as claimed in claim 1 wherein said end faces of the hubs lie in a plane extending radially through the axle so as to be substantially in contact with each other.

5. In a wheel and axle assembly as claimed in claim 1 wherein each friction disc member comprises two axially spaced friction discs so that each pair of brake discs comprises four braking surfaces.

* * * * *